(12) United States Patent
Hanrahan et al.

(10) Patent No.: US 12,313,000 B1
(45) Date of Patent: May 27, 2025

(54) SEPARATING AIRFLOWS WITHIN A TURBINE ENGINE

(71) Applicant: RTX Corporation, Farmington, CT (US)

(72) Inventors: Paul R. Hanrahan, Sedona, AZ (US); Kyle D. Crawford, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/646,189

(22) Filed: Apr. 25, 2024

(51) Int. Cl.
*F02C 7/052* (2006.01)

(52) U.S. Cl.
CPC .......... *F02C 7/052* (2013.01); *F05D 2240/35* (2013.01); *F05D 2260/607* (2013.01)

(58) Field of Classification Search
CPC . F02C 7/052; F05D 2240/35; F05D 2260/607
See application file for complete search history.

(56) References Cited

U.S. PATENT DOCUMENTS

| | | | |
|---|---|---|---|
| 3,720,045 A | 3/1973 | Murphy | |
| 6,308,511 B1 | 10/2001 | Beeck | |
| 6,651,439 B2 | 11/2003 | Al-Roub | |
| 7,581,397 B2 | 9/2009 | Strangman | |
| 7,827,799 B2 | 11/2010 | O'Neill | |
| 8,539,775 B1 | 9/2013 | Wong | |
| 10,724,437 B2 | 7/2020 | Atsuchi | |
| 11,608,782 B2 | 3/2023 | Menheere | |
| 2007/0125093 A1* | 6/2007 | Burd | F23R 3/04 60/752 |
| 2008/0173276 A1 | 7/2008 | Barnard | |
| 2018/0105283 A1 | 4/2018 | Dionne | |
| 2018/0106224 A1 | 4/2018 | Dionne | |
| 2018/0106225 A1 | 4/2018 | Dionne | |
| 2019/0264616 A1 | 8/2019 | Lovett | |

FOREIGN PATENT DOCUMENTS

GB  2270481 A  * 3/1994  ............. B01D 45/08

* cited by examiner

*Primary Examiner* — Steven M Sutherland
(74) *Attorney, Agent, or Firm* — Getz Balich LLC

(57) ABSTRACT

An apparatus is provided for a turbine engine. This turbine engine apparatus includes an air-debris separation structure, and the air-debris separation structure includes a first air-debris separator, a second air-debris separator and a separation structure outlet. The first air-debris separator includes a first separator inlet and a first separator outlet out from the air-debris separation structure. The first air-debris separator fluidly couples the first separator inlet to the first separator outlet and the separation structure outlet in parallel. The second air-debris separator includes a second separator inlet and a second separator outlet out from the air-debris separation structure. The second air-debris separator fluidly couples the second separator inlet to the second separator outlet and the separation structure outlet in parallel.

15 Claims, 12 Drawing Sheets

SEPARATING AIRFLOWS WITHIN A TURBINE ENGINE

BACKGROUND OF THE DISCLOSURE

1. Technical Field

This disclosure relates generally to an aircraft and, more particularly, to separating airflows within an aircraft engine.

2. Background Information

Various systems and methods are known in the art for separating airflows within an aircraft engine. While these known systems and methods have various benefits, there is still room in the art for improvement.

SUMMARY OF THE DISCLOSURE

According to an aspect of the present disclosure, an apparatus is provided for a turbine engine. This turbine engine apparatus includes an air-debris separation structure, and the air-debris separation structure includes a first air-debris separator, a second air-debris separator and a separation structure outlet. The first air-debris separator includes a first separator inlet and a first separator outlet out from the air-debris separation structure. The first air-debris separator fluidly couples the first separator inlet to the first separator outlet and the separation structure outlet in parallel. The second air-debris separator includes a second separator inlet and a second separator outlet out from the air-debris separation structure. The second air-debris separator fluidly couples the second separator inlet to the second separator outlet and the separation structure outlet in parallel.

According to another aspect of the present disclosure, another apparatus is provided for a turbine engine. This turbine engine apparatus includes an air-debris separation structure, and the air-debris separation structure includes a first air-debris separator, a second air-debris separator and a separation structure outlet. The first air-debris separator is configured to separate a first airflow received by the first air-debris separator into a first clean airflow and a first dirty airflow. The first air-debris separator is configured to direct the first dirty airflow out of the air-debris separation structure through the separation structure outlet. The second air-debris separator is configured to separate a second airflow received by the second air-debris separator into a second clean airflow and a second dirty airflow. The second air-debris separator is configured to direct the second dirty airflow out of the air-debris separation structure through the separation structure outlet along with the first dirty airflow.

According to still another aspect of the present disclosure, another apparatus is provided for a turbine engine. This turbine engine apparatus includes an engine core extending along an axis. The engine core includes a combustor, a diffuser plenum, a first air-debris separator and a second air-debris separator. The combustor is arranged within the diffuser plenum. The combustor includes a combustion chamber and a combustor wall between the combustion chamber and the diffuser plenum. The combustor wall includes a quench aperture extending through the combustor wall to the combustion chamber. The first air-debris separator includes a first separator inlet passage, a first separator clean air outlet passage and a first separator dirty air outlet passage that is fluidly coupled to the combustion chamber through the quench aperture. The first air-debris separator is configured to separate a first airflow received by the first separator inlet passage into a first clean airflow and a first dirty airflow. The first air-debris separator is configured to direct the first clean airflow out of the first air-debris separator through the first separator clean air outlet passage. The first air-debris separator is configured to direct the first dirty airflow out of the first air-debris separator through the first separator dirty air outlet passage. The second air-debris separator includes a second separator inlet passage, a second separator clean air outlet passage and a second separator dirty air outlet passage that is fluidly coupled to the combustion chamber through the quench aperture. The second air-debris separator is configured to separate a second airflow received by the second separator inlet passage into a second clean airflow and a second dirty airflow. The second air-debris separator is configured to direct the second clean airflow out of the second air-debris separator through the second separator clean air outlet passage. The second air-debris separator is configured to direct the second dirty airflow out of the second air-debris separator through the second separator dirty air outlet passage.

The first air-debris separator may be formed integral with the second air-debris separator.

The air-debris separation structure may be configured as a monolithic body.

The first air-debris separator may be configured to receive the first airflow through a first separator inlet into the air-debris separation structure. The second air-debris separator may be configured to receive the second airflow through a second separator inlet into the air-debris separation structure which is discrete from the first separator inlet.

The first air-debris separator may be configured to direct the first clean airflow out of the air-debris separation structure through a first separator outlet. The second air-debris separator may be configured to direct the second clean airflow out of the air-debris separation structure through a second separator outlet which is discrete from the first separator outlet.

The first air-debris separator may be next to and connected to the second air-debris separator.

The first air-debris separator may be formed integral with the second air-debris separator.

A first separator passage may project longitudinally within the first air-debris separator out from the first separator inlet towards the first separator outlet and the separation structure outlet. A second separator passage may project longitudinally within the second air-debris separator out from the second separator inlet towards the second separator outlet and the separation structure outlet. A sidewall of the air-debris separation structure may be between and may respectively form peripheral boundaries of the first separator passage and the second separator passage.

The first air-debris separator may be configured as or otherwise include a vortex tube separator.

The first air-debris separator may extend longitudinally along a centerline from a first separator upstream end to a first separator downstream end. The first separator inlet may be disposed at the first separator upstream end. The first separator outlet and the separation structure outlet may be disposed at the first separator downstream end.

The first air-debris separator may include a first separator center body, a first separator inner wall, a first separator outer wall, a first separator first outlet passage and a first separator second outlet passage. A first portion of the first separator center body may extend longitudinally in a bore of the first separator outer wall. A second portion of the first separator center body may extend longitudinally in a bore of the first separator inner wall. The first separator outer wall may extend longitudinally along and circumferentially about the first separator inner wall. The first separator first outlet passage may be formed within the first separator inner wall. The first separator first outlet passage may extend to the first separator first separator outlet. The first separator second outlet passage may be formed between the first separator inner wall and the first separator outer wall. The first separator second outlet passage may fluidly couple the first air-debris separator to the separation structure outlet.

The first air-debris separator may also include a first separator inlet passage. The first separator inlet passage may be formed within the first separator outer wall. The first separator inlet passage may extend from the first separator inlet to the first separator first outlet passage and the first separator second outlet passage.

The first air-debris separator may also include a plurality of first separator swirler vanes. Each of the first separator swirler vanes may project out from the first separator center body to the first separator outer wall.

The first air-debris separator may also include a plurality of first separator swirler vanes disposed at the first separator inlet.

The first air-debris separator may also include a plurality of first separator de-swirler vanes. Each of the first separator de-swirler vanes may project out from the first separator center body to the first separator inner wall.

The first air-debris separator may also include a plurality of first separator de-swirler vanes disposed within the bore of the first separator inner wall.

The first air-debris separator may also include a first separator helical endwall extending circumferentially about a first separator longitudinal centerline of the first air-debris separator and radially between the first separator inner wall and the first separator outer wall.

An angle, measured between the first separator helical endwall and a reference plane perpendicular to the first separator longitudinal centerline, may be between twenty degrees and forty degrees.

The first separator helical endwall may have a longitudinal endwall length along the first separator longitudinal centerline. The separation structure outlet may have a longitudinal outlet length along the first separator longitudinal centerline. The longitudinal outlet length may be between forty percent and eighty percent of the longitudinal endwall length.

The second air-debris separator may include a second separator center body, a second separator inner wall, a second separator outer wall, a second separator first outlet passage and a second separator second outlet passage. A first portion of the second separator center body may extend longitudinally in a bore of the second separator outer wall. A second portion of the second separator center body may extend longitudinally in a bore of the second separator inner wall. The second separator outer wall may extend longitudinally along and circumferentially about the second separator inner wall. The second separator outer wall may be connected to the first separator outer wall at a lateral interface between the first air-debris separator and the second air-debris separator. The second separator first outlet passage may be formed within the second separator inner wall. The second separator first outlet passage may extend to the second separator first separator outlet. The second separator second outlet passage may be formed between the second separator inner wall and the second separator outer wall. The second separator second outlet passage may fluidly couple the second air-debris separator to the separation structure outlet.

The air-debris separation structure may also include an outlet conduit which projects out from the first air-debris separator and the second air-debris separator and forms the separation structure outlet.

The turbine engine apparatus may also include an engine core extending along an axis. The engine core may include a combustor, a diffuser plenum and the air-debris separation structure. The combustor may be arranged within the diffuser plenum. The combustor may include a combustion chamber and a combustor wall between the combustion chamber and the diffuser plenum. The combustor wall may include a quench aperture extending through the combustor wall to the combustion chamber. The air-debris separation structure may be configured to receive compressed air from the diffuser plenum through the first separator inlet and the second separator inlet. The separation structure outlet may be fluidly coupled to the quench aperture.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
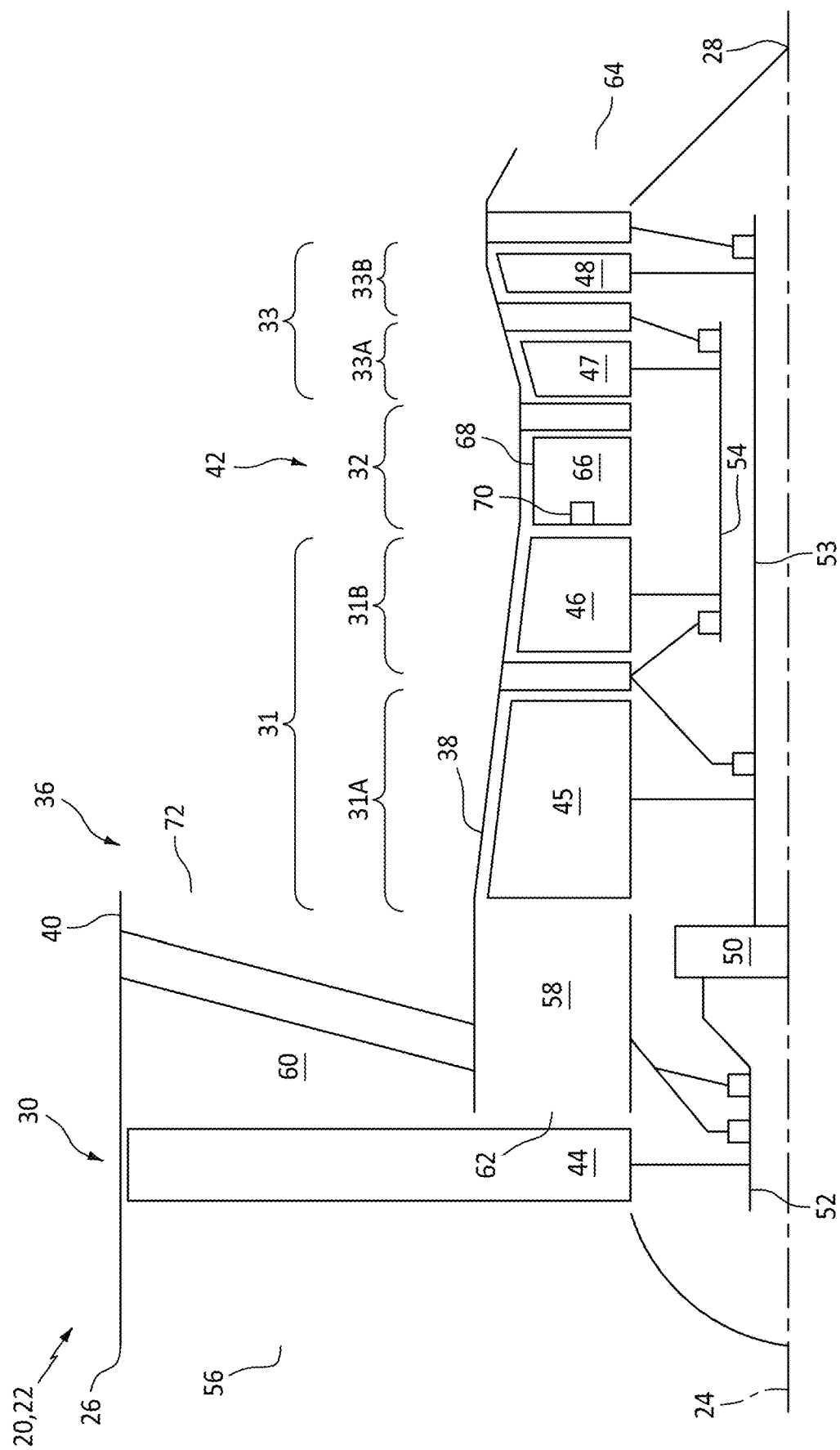
FIG. 1 is a partial schematic illustration of an aircraft powerplant.

FIG. 1 illustrates a powerplant 20 for an aircraft. The aircraft may be an airplane, a drone (e.g., an unmanned aerial vehicle (UAV)) or any other manned or unmanned aerial vehicle or system. The aircraft powerplant 20 may be configured as, or otherwise included as part of, a propulsion system for the aircraft. The aircraft powerplant 20 of FIG. 1, for example, is configured as a turbofan turbine engine 22. The aircraft powerplant 20 of the present disclosure, however, is not limited to turbofan turbine engines nor to propulsion system applications. The aircraft powerplant 20, for example, may alternatively be configured as a turbojet turbine engine, a turboshaft turbine engine, a turboprop turbine engine, a propfan turbine engine, a pusher fan turbine engine, or any other combustion engine operable to drive rotation of a ducted or open propulsor rotor. In another example, the aircraft powerplant 20 may be configured as, or otherwise included as part of, a power generation system for the aircraft such as an auxiliary power unit (APU).

The turbine engine 22 of FIG. 1 extends axially along an axis 24 between a forward, upstream end 26 of the turbine engine 22 and an aft, downstream end 28 of the turbine engine 22. Briefly, the axis 24 may be a centerline axis of the turbine engine 22 and/or one or more of its members. The axis 24 may also or alternatively be a rotational axis of one or more rotating members of the turbine engine 22. The turbine engine 22 of FIG. 1 includes a fan section 30, a compressor section 31, a combustion section 32 and a turbine section 33. The compressor section 31 of FIG. 1 includes a low pressure compressor (LPC) section 31A and a high pressure compressor (HPC) section 31B. The turbine section 33 of FIG. 1 includes a high pressure turbine (HPT) section 33A and a low pressure turbine (LPT) section 33B.

The engine sections 30-33B of FIG. 1 are arranged within and/or are formed by a stationary engine structure 36; e.g., an engine housing. This engine structure 36 includes a stationary inner structure 38 (e.g., a core casing structure) and a stationary outer structure 40 (e.g., a fan casing structure). The inner structure 38 may house one or more of the engine sections 31A-33B; e.g., a core 42 of the turbine engine 22. The outer structure 40 may house at least the fan section 30.

Each of the engine sections 30, 31A, 31B, 33A and 33B includes a respective bladed rotor 44-48. Each of these bladed rotors 44-48 includes a plurality of rotor blades arranged circumferentially around and connected to one or more respective rotor disks and/or hubs. The rotor blades, for example, may be formed integral with or mechanically fastened, welded, brazed and/or otherwise attached to the respective rotor disk(s) and/or the respective hub(s).

The fan rotor 44 is connected to a geartrain 50, for example, through a fan shaft 52. The geartrain 50 and the LPC rotor 45 are connected to and driven by the LPT rotor 48 through a low speed shaft 53. The HPC rotor 46 is connected to and driven by the HPT rotor 47 through a high speed shaft 54. The engine shafts 52-54 are rotatably supported by a plurality of bearings which mount the engine shafts 52-54 to the inner structure 38. The rotatable members 44-48 and 52-54 of the turbine engine 22 may thereby rotate about the axis 24.

During turbine engine operation, air enters the turbine engine 22 through an airflow inlet 56 into the turbine engine 22. This air is directed through the fan section 30 and into a core flowpath 58 and a bypass flowpath 60. The core flowpath 58 extends sequentially through the engine sections 31A-33B from an inlet 62 into the core flowpath 58 to an exhaust 64 from the core flowpath 58. The air within the core flowpath 58 may be referred to as "core air". The bypass flowpath 60 extends through a bypass duct and bypasses the engine core 42. The air within the bypass flowpath 60 may be referred to as "bypass air".

The core air is compressed by the LPC rotor 45 and the HPC rotor 46 and directed into a combustion chamber 66 of a combustor 68 in the combustion section 32. Fuel is injected or otherwise delivered by one or more fuel injector assemblies 70 (one visible in FIG. 1) into the combustion chamber 66 and mixed with the compressed core air to provide a fuel-air mixture. This fuel-air mixture is ignited and combustion products thereof flow through and sequentially drive rotation of the HPT rotor 47 and the LPT rotor 48 before being directed out of the turbine engine 22 through the core exhaust 64. The rotation of the HPT rotor 47 and the LPT rotor 48 respectively drive rotation of the HPC rotor 46 and the LPC rotor 45 and, thus, compression of the air received from the core inlet 62. The rotation of the LPT rotor 48 also drives rotation of the fan rotor 44. The rotation of the fan rotor 44 propels the bypass air through the bypass flowpath 60 and out of the turbine engine 22 through an exhaust 72 from the bypass flowpath 60. The propulsion of the bypass air may account for a majority of thrust generated by the aircraft propulsion system and its turbine engine 22.

Figure 2:
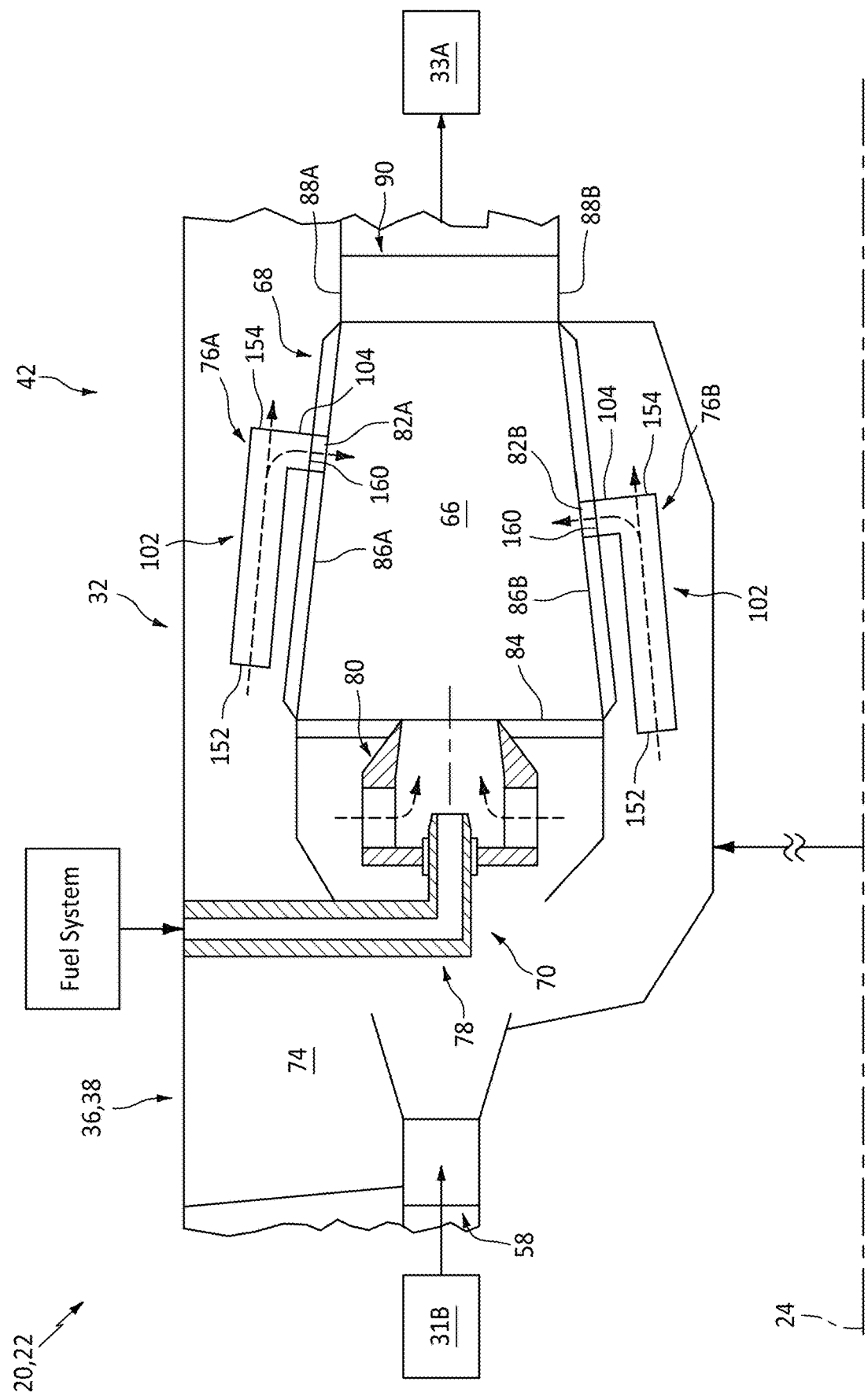
FIG. 2 is a schematic illustration of a portion of the aircraft powerplant between a compressor section and a turbine section.

FIG. 2 illustrate a portion of the combustion section 32 along the core flowpath 58 between the HPC section 31B and the HPT section 33A. This combustion section 32 includes the combustor 68, a (e.g., annular) diffuser plenum 74, the one or more injector assemblies 70, one or more outer air-debris separation structures 76A ("outer separation structures"), and one or more inner air-debris separation structures 76B ("inner separation structures"). Briefly, the combustor 68 is disposed within (e.g., surrounded by) the diffuser plenum 74. This diffuser plenum 74 receives the compressed core air from the HPC section 31B for subsequent provision into the combustion chamber 66. Each injector assembly 70 of FIG. 2 includes a fuel injector 78 mated with an air swirler structure 80. The fuel injector 78 injects the fuel into the combustion chamber 66. The air swirler structure 80 directs some of the core air from the diffuser plenum 74 into the combustion chamber 66 in a manner that facilitates mixing the core air with the injected fuel. One or more igniters (not shown) ignite the fuel-air mixture within the combustion chamber 66. One or more quench apertures 82A, 82B (e.g., dilution holes) in each wall of the combustor 68 direct additional core air from the diffuser plenum 74, via the respective air-debris separation structures 76A, 76B (generally referred to as "76"), into the combustion chamber 66 as quench air (e.g., dilution air). This quench air may stoichiometrically lean (e.g., quench) the combustion products (e.g., the ignited fuel-air mixture) within the combustion chamber 66.

The combustor 68 may be configured as an annular combustor; e.g., an annular floating wall combustor. The combustor 68 of FIGS. 2 and 3, for example, includes an annular combustor bulkhead wall 84 ("bulkhead"), the tubular outer combustor wall 86A ("outer wall"), and the tubular inner combustor wall 86B ("inner wall"). The bulkhead 84 of FIG. 2 extends radially between and to the inner wall 86B and the outer wall 86A. The bulkhead 84 may be connected (e.g., mechanically fastened or otherwise attached) to the inner wall 86B and/or the outer wall 86A. The inner wall 86B and the outer wall 86A each project axially along the axis 24 out from the bulkhead 84 towards the HPT section 33A. The inner wall 86B of FIG. 2, for example, projects axially to and may be connected to an (e.g., tubular) inner platform 88B of a downstream stator vane array 90 in the HPT section 33A. The outer wall 86A of FIG. 2 projects axially to and may be connected to an (e.g., tubular) outer platform 88A of the downstream stator vane array 90. With the arrangement of FIG. 2, the combustion chamber 66 is formed by and extends radially within the combustor 68 between and to the inner wall 86B and the outer wall 86A. The combustion chamber 66 is formed by and extends axially (in an upstream direction along the core flowpath 58) into the combustor 68 from the stator vane array 90 to the bulkhead 84. The combustion chamber 66 also extends within the combustor 68 circumferentially about (e.g., completely around) the axis 24, which may configure the combustion chamber 66 as a full-hoop annulus.

Figure 3:
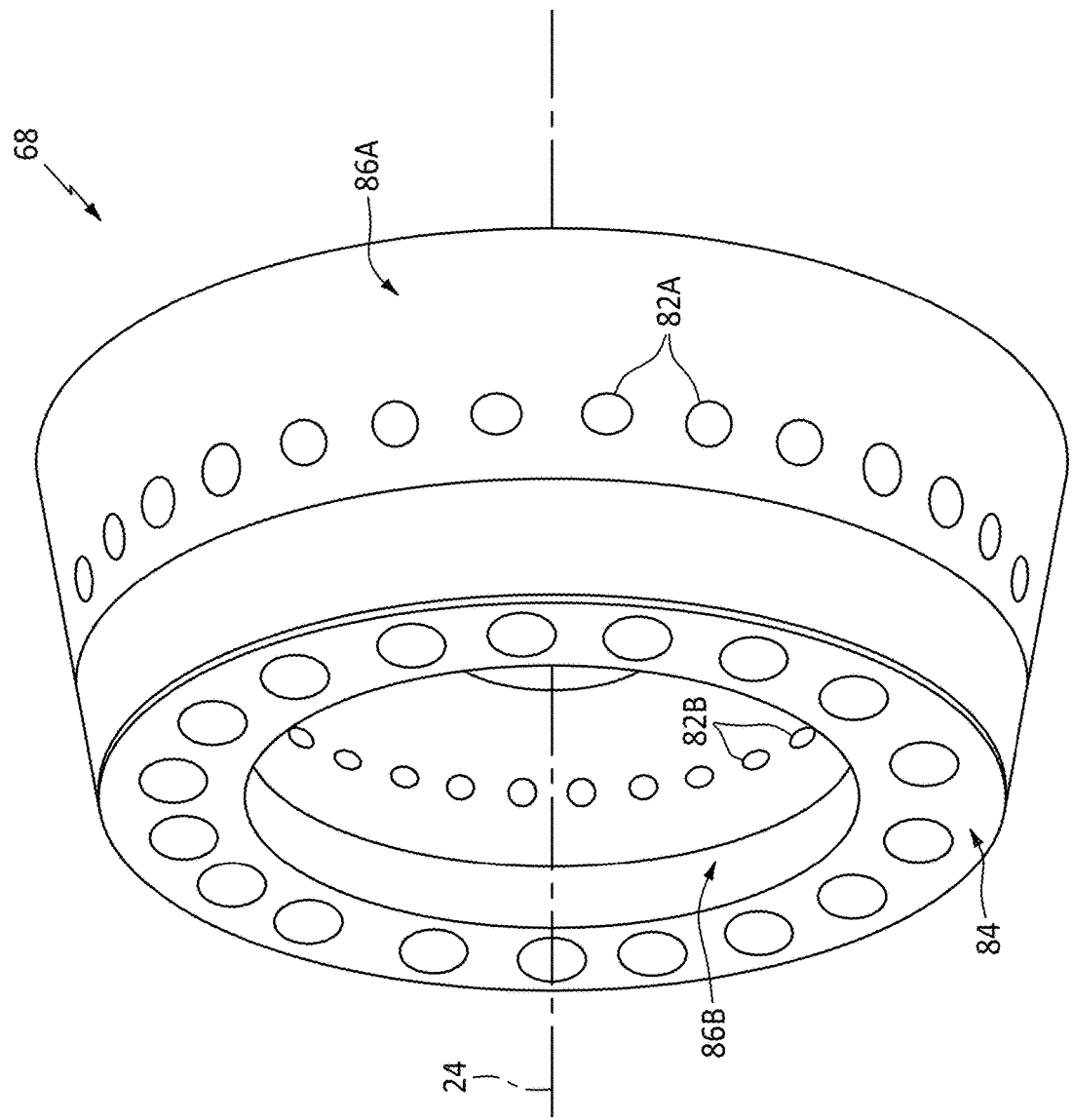
FIG. 3 is a perspective schematic illustration of a combustor.

Referring to FIG. 3, the inner quench apertures 82B are arranged circumferentially about the axis 24 in an array (e.g., a circular array) in the inner wall 86B. The outer quench apertures 82A are similarly arranged about the axis 24 in an array (e.g., a circular array) in the outer wall 86A. Referring to FIG. 2, each of the quench apertures 82A, 82B (generally referred to as "82") extends (e.g., radially) through the respective combustor wall 86A, 86B (generally referred to as "86") to the combustion chamber 66. Each combustor wall 86 may also include (or may not include) one or more cooling apertures (not shown in FIGS. 2 and 3 for clarity of illustration); e.g., effusion aperture, cooling slots, etc. and may direct the core air into the combustion chamber 66. However, by contrast to the quench apertures 82, each cooling aperture may have a flow area (e.g., a cross-sectional area) which is significantly smaller than (e.g., 5×, 10×, 15×, 20× smaller than) a flow area (e.g., a cross-sectional area) of each quench aperture 82. Moreover, whereas the cooling apertures (when provided) are configured to facilitate cooling (e.g., film cooling) of a hot side of the respective combustor wall 86, the quench apertures 82 may be provided to tune combustion of the fuel-air mixture within the combustion chamber 66 as generally described above.

Figure 4:
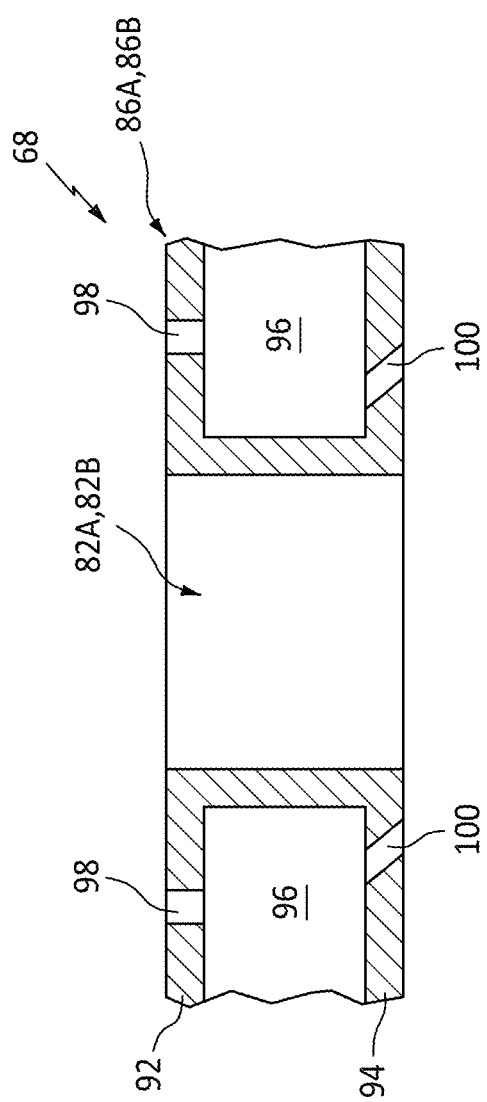
FIG. 4 is a partial sectional illustration of a multi-layered combustor wall.

Each of the combustor walls 86 may each be configured as a multi-layer combustor wall; e.g., a hollow, dual-walled structure. For example, referring to FIG. 4, each combustor wall 86 may include a combustor wall shell 92, a combustor wall heat shield 94 (e.g., a liner) and one or more combustor wall cooling cavities 96 (e.g., impingement cavities) formed by and (e.g., radially) between the shell 92 and the heat shield 94. Each cooling cavity 96 may be fluidly coupled with the diffuser plenum 74 (see FIG. 2) through one or more shell cooling apertures 98 in the shell 92; e.g., impingement apertures. Each cooling cavity 96 may be fluidly coupled with the combustion chamber 66 (see FIG. 2) through one or more heat shield cooling apertures 100 in the heat shield 94; e.g., effusion apertures. Here, the quench apertures 82 are fluidly discrete from the cooling cavities 96, and each of the quench apertures 82 extends through the both the shell 92 and the heat shield 94; e.g., through an entire thickness of the respective combustor wall 86. Alternatively, any one or more of the combustor walls 86A and/or 86B may be configured as a single layer combustor wall.

Referring to FIG. 2, the outer separation structures 76A are located in the diffuser plenum 74. These outer separation structures 76A are located radially outboard of and may be next to the combustor 68 and its outer wall 86A. The outer separation structures 76A are arranged circumferentially about the axis 24 in an array; e.g., a circular array. This array of the outer separation structures 76A may thereby circumscribe the combustor 68 and its outer wall 86A; see also FIG. 12. Similarly, inner separation structures 76B of FIG. 2 are located in the diffuser plenum 74. These inner separation structures 76B are located radially inboard of and may be next to the combustor 68 and its inner wall 86B. The inner separation structures 76B are arranged circumferentially about the axis 24 in an array; e.g., a circular array. This array of the inner separation structures 76B may thereby be circumscribed by the combustor 68 and its outer wall 86A; see also FIG. 12.

Figure 5:
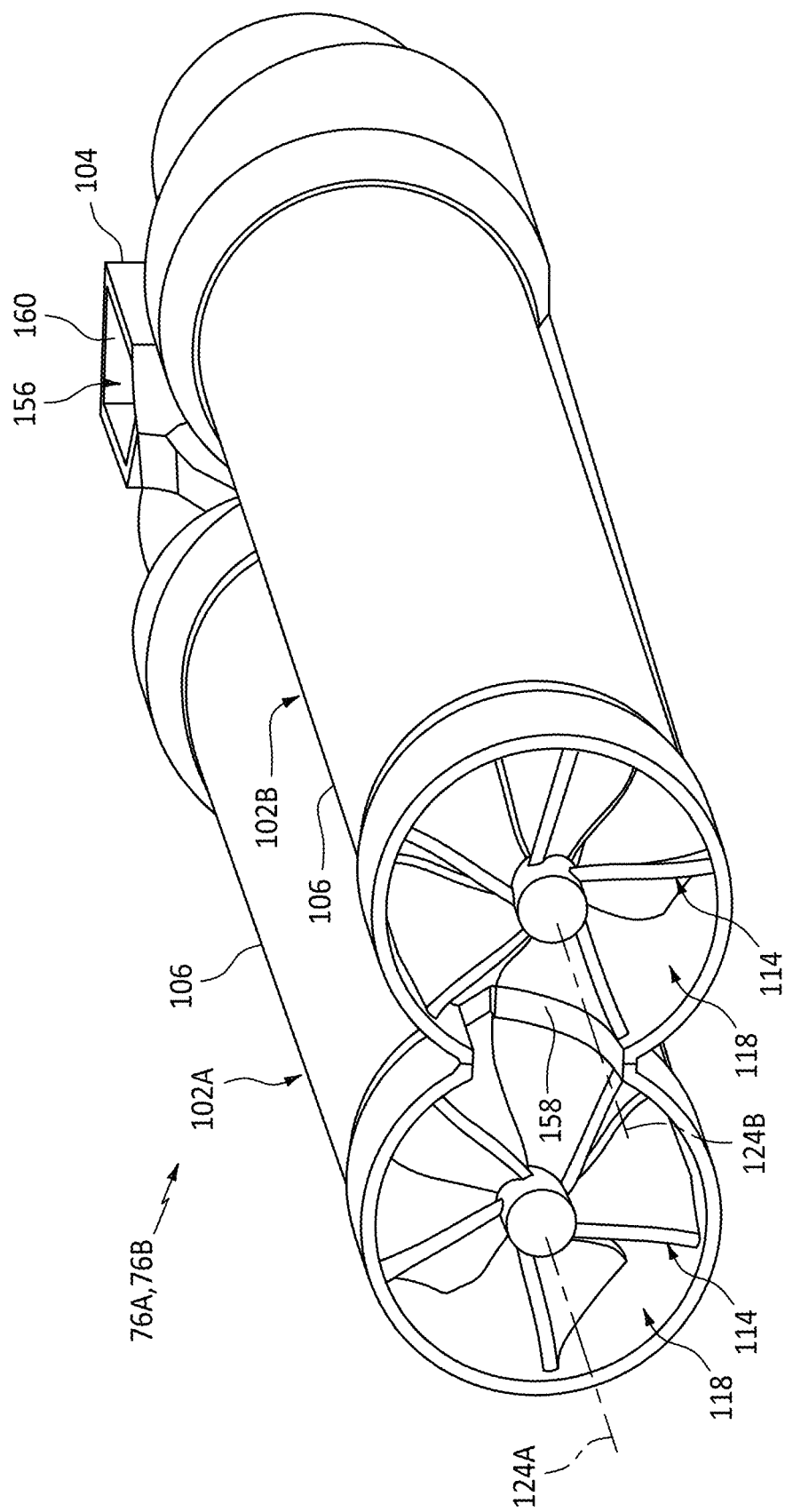
FIG. 5 is a perspective illustration of an air-debris separation structure with multiple air-debris separators.

Referring to FIG. 5, each air-debris separation structure 76 may be configured as an integrated grouping of air-debris separators 102A and 102B (generally referred to as "102"). The air-debris separation structure 76 of FIG. 5, for example, includes its multiple air-debris separators 102 as well as a common dirty air outlet conduit 104 for (e.g., dedicated to) the air-debris separators 102 of that respective air-debris separation structure 76.

Figure 6:
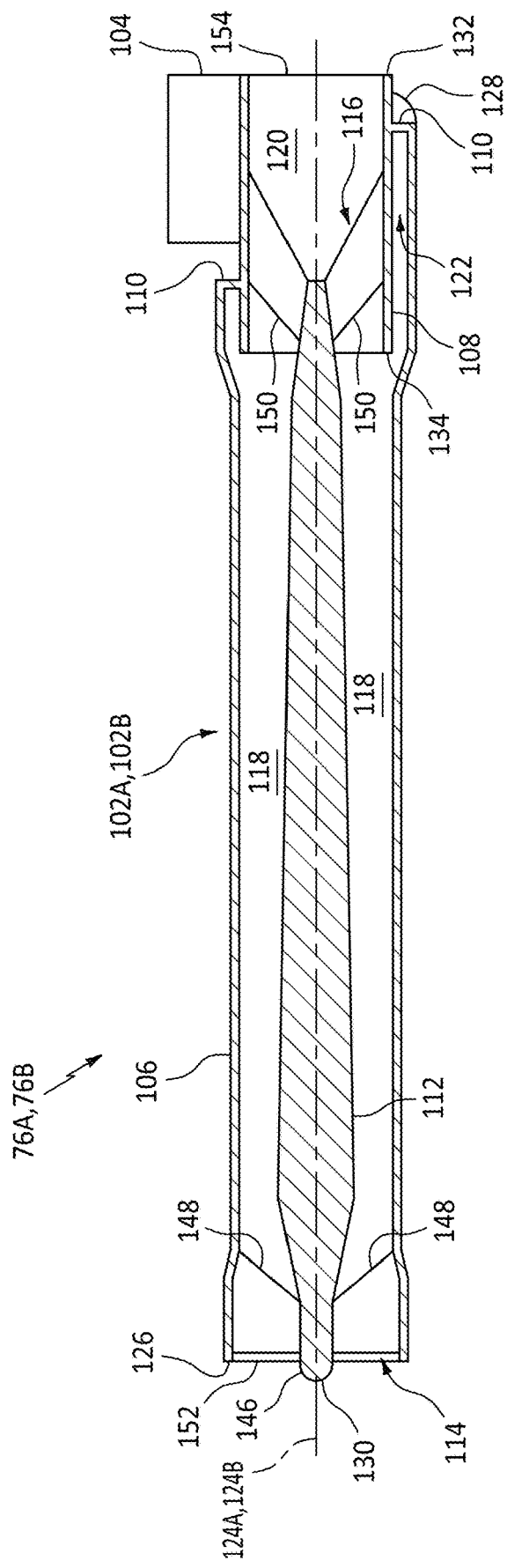
FIG. 6 is a side sectional illustration of the air-debris separation structure along one of the air-debris separators.

Referring to FIG. 6, each air-debris separator 102 may be configured as a cyclonic separator such as a vortex tube separator (VTS). The air-debris separator 102 of FIG. 6, for example, includes a separator outer wall 106, a separator inner wall 108, a separator endwall 110, a separator center body 112, a separator swirler 114 and a separator de-swirler 116. This air-debris separator 102 also includes a separator inlet passage 118, a separator clean air outlet passage 120 and a separator dirty air outlet passage 122.

Figure 7:
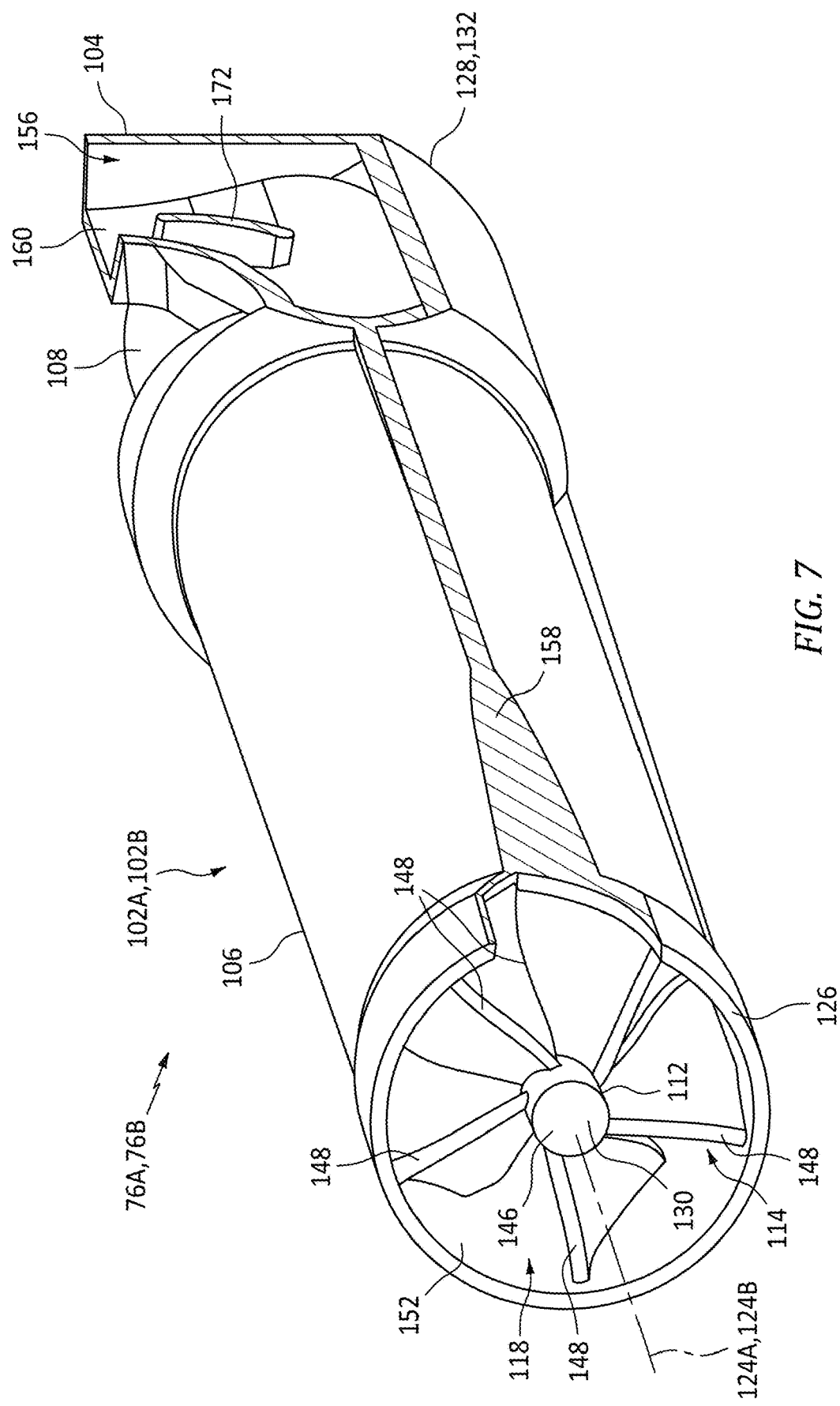
FIG. 7 is a perspective cutaway illustration of the air-debris separation structure along one of the air-debris separators.

The separator outer wall 106 extends longitudinally along a longitudinal centerline 124A, 124B (generally referred to as "124") of the respective air-debris separator 102 from an upstream end 126 of the separator outer wall 106 to a downstream end 128 of the separator outer wall 106; see also FIG. 7. The outer wall upstream end 126 may be disposed at (e.g., on, adjacent or proximate) or otherwise near an upstream end 130 of the respective air-debris separator 102. The outer wall upstream end 126 of FIG. 6, for example, is (e.g., slightly) longitudinally recessed (in a downstream direction) from the separator upstream end 130. Similarly, the outer wall downstream end 128 may be disposed at or near a downstream end 132 of the respective air-debris separator 102. The outer wall downstream end 128 of FIG. 7, for example, is aligned with the separator downstream end 132. The separator outer wall 106 extends circumferentially about (e.g., completely around) the respective separator centerline 124 providing the separator outer wall 106 with, for example, a full-hoop (e.g., tubular) geometry.

Figure 8:
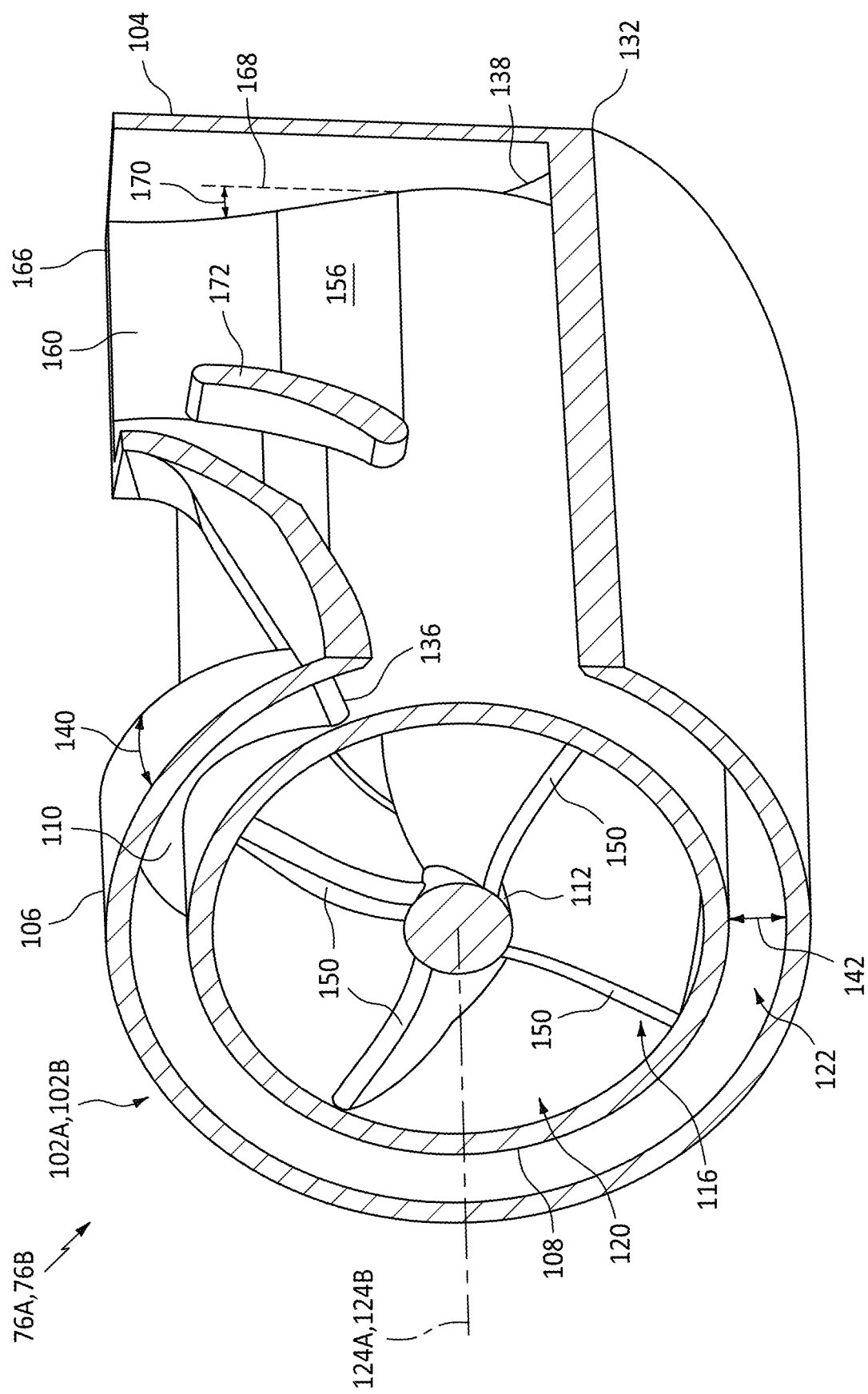
FIG. 8 is a partial perspective cutaway illustration of the air-debris separation structure along one of the air-debris separators at a downstream end of the air-debris separator.

Referring to FIG. 6, the separator inner wall 108 is disposed partially within an inner bore of the separator outer wall 106. The separator inner wall 108 of FIG. 6, for example, projects longitudinally along the respective separator centerline 124 from the separator downstream end 132, into the inner bore of the separator outer wall 106, to an upstream end 134 of the separator inner wall 108. Here, the inner wall upstream end 134 is longitudinally spaced from the outer wall upstream end 126 by a longitudinal distance along the respective separator centerline 124 which may be greater than at least two-thirds (⅔), four-fifths (⅘), or seven-eighths (⅞) of a longitudinal length of the respective air-debris separator 102. Referring to FIG. 8, the separator inner wall 108 extends circumferentially about (e.g., completely around) the respective separator centerline 124 providing the separator inner wall 108 with, for example, a full-hoop (e.g., tubular) geometry.

Figure 9:
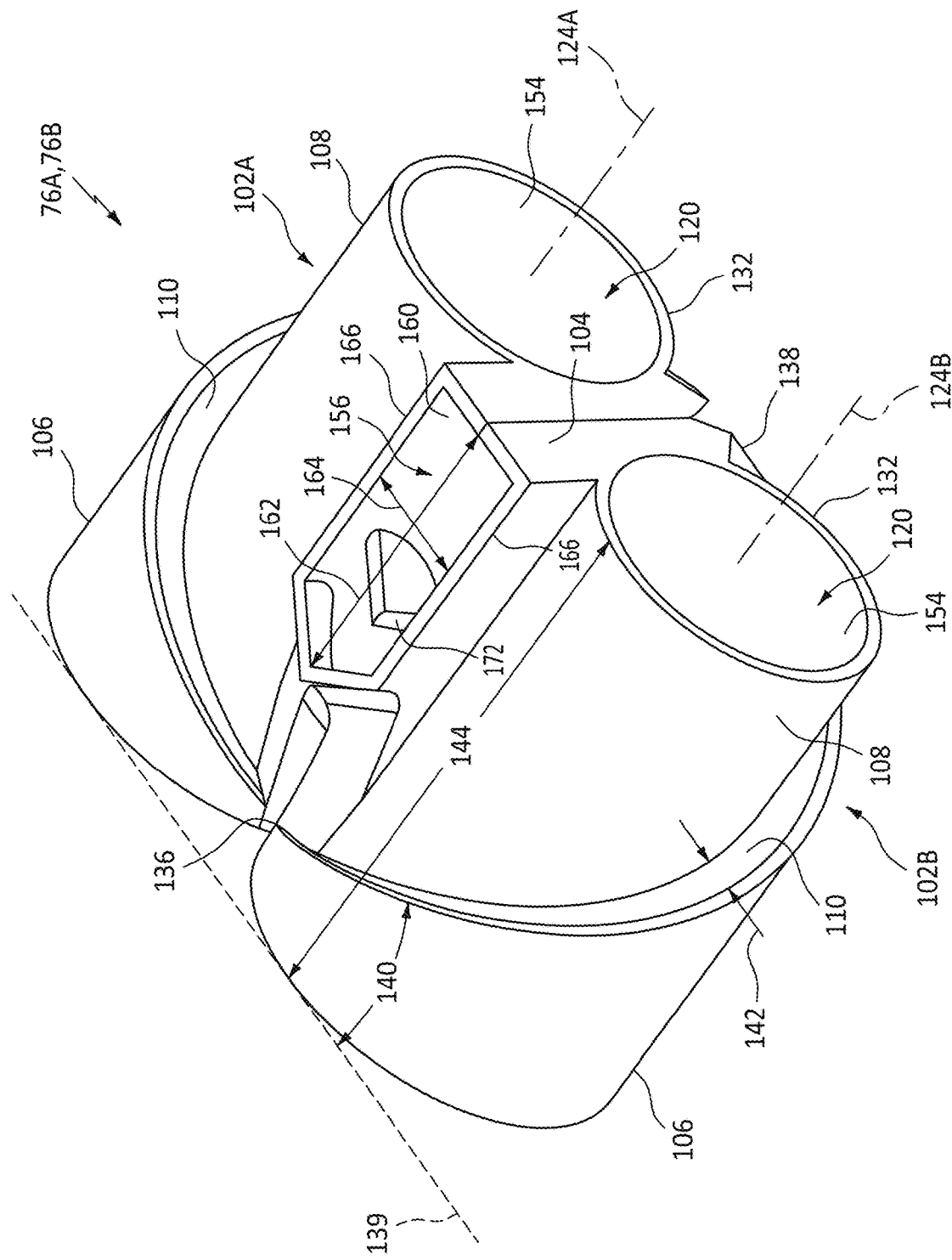
FIG. 9 is a partial perspective illustration of the air-debris separation structure at a downstream end thereof.

Referring to FIGS. 8 and 9, the separator endwall 110 is disposed radially between and is connected to (e.g., formed integral with or otherwise attached to) the separator inner wall 108 and the separator outer wall 106. The separator endwall 110 of FIGS. 8 and 9, for example, projects radially out from a radial outer side of the separator inner wall 108 to a radial inner side of the separator outer wall 106. The separator endwall 110 extends circumferentially about (e.g., partially around) the respective separator centerline 124 and the separator inner wall 108 from an upstream end 136 of the separator endwall 110 to a downstream end 138 of the separator endwall 110. As the separator endwall 110 extends circumferentially, the separator endwall 110 also extends longitudinally along the respective separator centerline 124 from the endwall upstream end 136 to the endwall downstream end 138. Referring to FIG. 9, the separator endwall 110 may thereby be configured as a helical endwall; e.g., a volute endwall.

The separator endwall 110 of FIG. 9 is angularly offset from a reference plane 139 by an included offset angle 140. The reference plane 139 is perpendicular to the respective separator centerline 124. The endwall offset angle 140 may be a non-zero acute angle between, for example, twenty degrees (20°) and forty degrees (40°); e.g., twenty-five degrees (25°). This endwall offset angle 140 may be uniform (e.g., constant) as the separator endwall 110 spirals around the respective separator centerline 124 from the endwall upstream end 136 to the endwall downstream end 138. It is contemplated, however, the endwall offset angle 140 may alternatively change (e.g., increase or decrease) as the separator endwall 110 spirals around the respective separator centerline 124 for select separator applications.

The separator endwall 110 has a radial height 142 measured radially from the outer side of the separator inner wall 108 to the inner side of the separator outer wall 106; see also FIG. 8. The separator endwall 110 also has a longitudinal length 144 measured longitudinally form the endwall upstream end 136 to the endwall downstream end 138. The endwall length 144 may be at least ten to fifteen times (10-15×) the endwall height 142; e.g., between twenty times (20×) and twenty-five times (25×) the endwall height 142. This relationship, however, may vary based on the specific application. Referring to FIG. 8, the endwall upstream end 136 is disposed at the inner wall upstream end 134 (see FIG. 6). Referring to FIG. 9, the endwall downstream end 138 is disposed at the separator downstream end 132.

Referring to FIG. 6, the separator center body 112 is disposed partially within the inner bore of the separator outer wall 106 and partially within an inner bore of the separator inner wall 108. An upstream portion of the separator center body 112, for example, is centered in and extends longitudinally in the inner bore of the separator outer wall 106. However, an upstream nose 146 of the separator center body 112 and its upstream portion may be disposed outside and upstream of the separator outer wall 106; e.g., at the separator upstream end 130. A downstream portion of the separator center body 112 is centered in and extends longitudinally in the inner bore of the separator inner wall 108. More particularly, the downstream portion of the separator center body 112 projects longitudinally along the respective separator centerline 124 out from the inner bore of the separator outer wall 106 and into the inner bore of the separator inner wall 108 partially towards the separator downstream end 132.

Referring to FIG. 7, the separator swirler 114 may be arranged at (or near) the separator upstream end 130/the outer wall upstream end 126. The separator swirler 114 of FIG. 7 includes a plurality of swirler vanes 148 (e.g., airfoils) disposed within the inner bore of the separator outer wall 106. These swirler vanes 148 are arranged circumferentially about the respective separator centerline 124 and the separator center body 112 in an array; e.g., a circular array. Each of the swirler vanes 148 is disposed radially between and connected to (e.g., formed integral with or otherwise attached to) the separator center body 112 and the separator outer wall 106. Each of the swirler vanes 148 of FIG. 7, for example, projects radially out from a radial outer side of the separator center body 112, radially across the inlet passage 118, to the inner side of the separator outer wall 106. The swirler vanes 148 may thereby structurally connect the separator center body 112 to the separator outer wall 106. In addition, the swirler vanes 148 are configured to impart swirl to and/or otherwise condition the air flowing into/through the inlet passage 118.

Referring to FIG. 6, the separator de-swirler 116 may be arranged near the separator downstream end 132; e.g., at the inner wall upstream end 134. The separator de-swirler 116 of FIG. 8 includes a plurality of de-swirler vanes 150 (e.g., airfoils) disposed within the inner bore of the separator inner wall 108. These de-swirler vanes 150 are arranged circumferentially about the respective separator centerline 124 and the separator center body 112 in an array; e.g., a circular array. Each of the de-swirler vanes 150 is disposed radially between and connected to (e.g., formed integral with or otherwise attached to) the separator center body 112 and the separator inner wall 108. Each of the de-swirler vanes 150 of FIG. 8, for example, projects radially out from the outer side of the separator center body 112, radially across the clean air outlet passage 120, to a radial inner side of the separator inner wall 108. The de-swirler vanes 150 may thereby structurally connect the separator center body 112 to the separator inner wall 108. In addition, the de-swirler vanes 150 are configured to de-swirl and/or otherwise condition the air flowing into/through/out of the clean air outlet passage 120.

Referring to FIG. 6, the inlet passage 118 extends longitudinally within the respective air-debris separator 102 along the respective separator centerline 124 from (a) an airflow inlet 152 into the respective air-debris separator 102 and its inlet passage 118 to (b) an inlet into the clean air outlet passage 120 and an inlet into the dirty air outlet passage 122. The separator inlet 152 of FIG. 6 is disposed at the separator upstream end 130/the outer wall upstream end 126. At a downstream end of the inlet passage 118/the inner wall upstream end 134 of FIG. 6, the clean air outlet passage 120 and the dirty air outlet passage 122 are fluidly coupled to the inlet passage 118 in parallel. The inlet passage 118 extends radially between the separator center body 112 and the separator outer wall 106. The inlet passage 118 extends circumferentially about (e.g., completely around) the respective separator centerline 124 and the separator center body 112 providing the inlet passage 118 with, for example, a full-hoop (e.g., annular) geometry. The separator center body 112 may thereby form a radial inner peripheral boundary of the inlet passage 118. The separator outer wall 106 may form a radial outer peripheral boundary of the inlet passage 118.

The clean air outlet passage 120 extends longitudinally within the respective air-debris separator 102 along the respective separator centerline 124 from the downstream end of the inlet passage 118 to a clean air outlet 154 from the respective air-debris separator 102 and its clean air outlet passage 120. The separator clean air outlet 154 of FIG. 6 is disposed at the separator downstream end 132. An upstream portion of the clean air outlet passage 120 extends radially between the separator center body 112 and the separator inner wall 108. A downstream portion of the clean air outlet passage 120 projects radially out from the respective separator centerline 124 to the separator inner wall 108. The clean air outlet passage 120 extends circumferentially about (e.g., completely around) the respective separator centerline 124 and the separator center body 112. The separator center body 112 may thereby form a radial inner peripheral boundary of the upstream portion of the clean air outlet passage 120. The separator inner wall 108 may form a radial outer peripheral boundary of the (e.g., entire) clean air outlet passage 120.

The dirty air outlet passage 122 extends longitudinally within the respective air-debris separator 102 along the respective separator centerline 124 from the downstream end of the inlet passage 118 to the separator endwall 110. The dirty air outlet passage 122 also spiral around the respective separator centerline 124 and the separator inner wall 108, along the separator endwall 110, from the downstream end of the inlet passage 118 to the outlet conduit 104. The dirty air outlet passage 122 of FIG. 8 thereby fluidly couples the inlet passage 118 (see FIG. 6) to a conduit outlet passage 156 formed by an internal bore of the outlet conduit 104. The dirty air outlet passage 122 extends radially between the separator inner wall 108 and the separator outer wall 106. The separator inner wall 108 may thereby form a radial inner peripheral boundary of the dirty air outlet passage 122. The separator outer wall 106 may form a radial outer peripheral boundary of the dirty air outlet passage 122.

Referring to FIG. 5, the first air-debris separator 102A is arranged laterally (e.g., radially relative to each separator centerline 124) next to the second air-debris separator 102B included in the same air-debris separation structure 76. These air-debris separators 102 are also connected to one another; e.g., formed integral with one another or otherwise attached to one another. The first air-debris separator 102A and the second air-debris separator 102B of FIG. 5, for example, share a common sidewall 158; see also FIG. 7. This common sidewall 158 of FIGS. 5 and 7 forms a respective portion of each separator outer wall 106. Here, the air-debris separators 102 of the air-debris separation structure 76 have substantially the same configuration. However, the second air-debris separator 102B of FIG. 5 is configured as a mirror image of the first air-debris separator 102A. For example, the separator swirler 114 of the first air-debris separator 102A may swirler air in a first circumferential direction (e.g., counterclockwise) about its separator centerline 124A whereas the separator swirler 114 of the second air-debris separator 102B may swirl the incoming air in a second circumferential direction (e.g., clockwise) about its separator centerline 124B. The separator de-swirlers 116 of the air-debris separators 102 (see FIG. 8) may similarly de-swirl the outgoing clean air in opposite circumferential directions.

Referring to FIGS. 8 and 9, the outlet conduit 104 is connected to (e.g., formed integral with or otherwise attached to) the first air-debris separator 102A and the second air-debris separator 102B at their downstream ends 132. The outlet conduit 104 is arranged laterally between the first air-debris separator 102A and the second air-debris separator 102B. The outlet conduit 104 projects (e.g., tangentially) out from each separator outer wall 106 and each separator inner wall 108 to a distal end of the outlet conduit 104. The conduit outlet passage 156 is fluidly coupled to the dirty air outlet passages 122 (see FIG. 6) of the air-debris separators 102 in parallel. The conduit outlet passage 156 projects through the outlet conduit 104 to a dirty air outlet 160 from the air-debris separation structure 76. By providing the air-debris separators 102 with this common outlet conduit 104 and separation structure outlet 160, each air-debris separator 102 can affectively be provided with a larger hydraulic diameter to reduce flow resistance for dirty air being output from the respective air-debris separator 102.

Referring to FIG. 9, the separation structure outlet 160 has a longitudinal length 162 measured between opposing ends of the separation structure outlet 160 along the separator centerlines 124. The separation structure outlet 160 has a lateral width 164 measured between opposing sides of the separation structure outlet 160. The structure outlet length 162 may be up to three times (3×) the structure outlet width 164; e.g., two and one-half times (2.5×) the structure outlet width 164. The structure outlet length 162 may also or alternatively be between forty percent (40%) and eighty percent (80%) the endwall length 144.

Referring to FIG. 8, the outlet conduit 104 and its conduit outlet passage 156 may laterally flare outwards as the outlet conduit 104 and its conduit outlet passage 156 project away from the first air-debris separator 102A and the second air-debris separator 102B. For example, each sidewall 166 of the outlet conduit 104 may be angularly offset from a centerline of the outlet conduit 104 (and a reference line 168 parallel with the centerline) by an included offset angle 170. This sidewall offset angle 170 may be a non-zero acute angle between, for example, seven and fifteen degrees (7-15°); e.g., twelve degrees (12°). With this arrangement, flow separation along the sidewall 166 may be reduced. In addition or alternatively, the air-debris separation structure 76 may include a turning vane 172 within the conduit outlet passage 156 to guide flow from the dirty air outlet passages 122 into the conduit outlet passage 156.

Referring to FIG. 2, each separator inlet 152 of the air-debris separation structure 76 is fluidly coupled with an upstream region of the diffuser plenum 74. Each separator clean air outlet 154 is fluidly coupled with a downstream region of the diffuser plenum 74. Each separation structure outlet 160 is fluidly coupled to a respective one of the quench apertures 82.

During turbine engine operation, referring to FIG. 6, each air-debris separator 102 receives diffused core air from the upstream region of the diffuser plenum 74 (see FIG. 2). Under certain conditions, this core air may include debris such as, but not limited to, dirt, sand or other foreign particulate matter ingesting into the turbine engine 22 (see FIG. 1). Within each air-debris separator 102, the incoming (e.g., dirty) air is swirled by the separator swirler 114 around the separator center body 112. This swirling may cause the relatively heavy debris to move towards/to the inner side of the separator outer wall 106 while the lighter clean air may flow closer to and along the separator center body 112. The debris along with a portion of the core air flows into the dirty air outlet passage 122, and the dirty air outlet passage 122 directs that dirty air into the combustion chamber 66 (see FIG. 2) through the respective conduit outlet passage 156 and the respective quench aperture 82 (see FIG. 8). The clean air, by contrast, flows into the clean air outlet passage 120 and is directed into the downstream region of the diffuser plenum 74 (see FIG. 2) through the respective separator clean air outlet 154. With this arrangement, the dirty air and its debris is directed through a relatively large openings—the respective quench apertures 82. The clean air, on the other hand, may flow through smaller downstream apertures/passages; e.g., combustor wall cooling apertures, cooling apertures in the downstream stator vane array 90, etc. Since the clean air includes little or no debris, the foregoing separation of the debris may reduce likelihood of debris accumulating on an engine component and clogging its relatively small apertures/passages.

Figure 10:
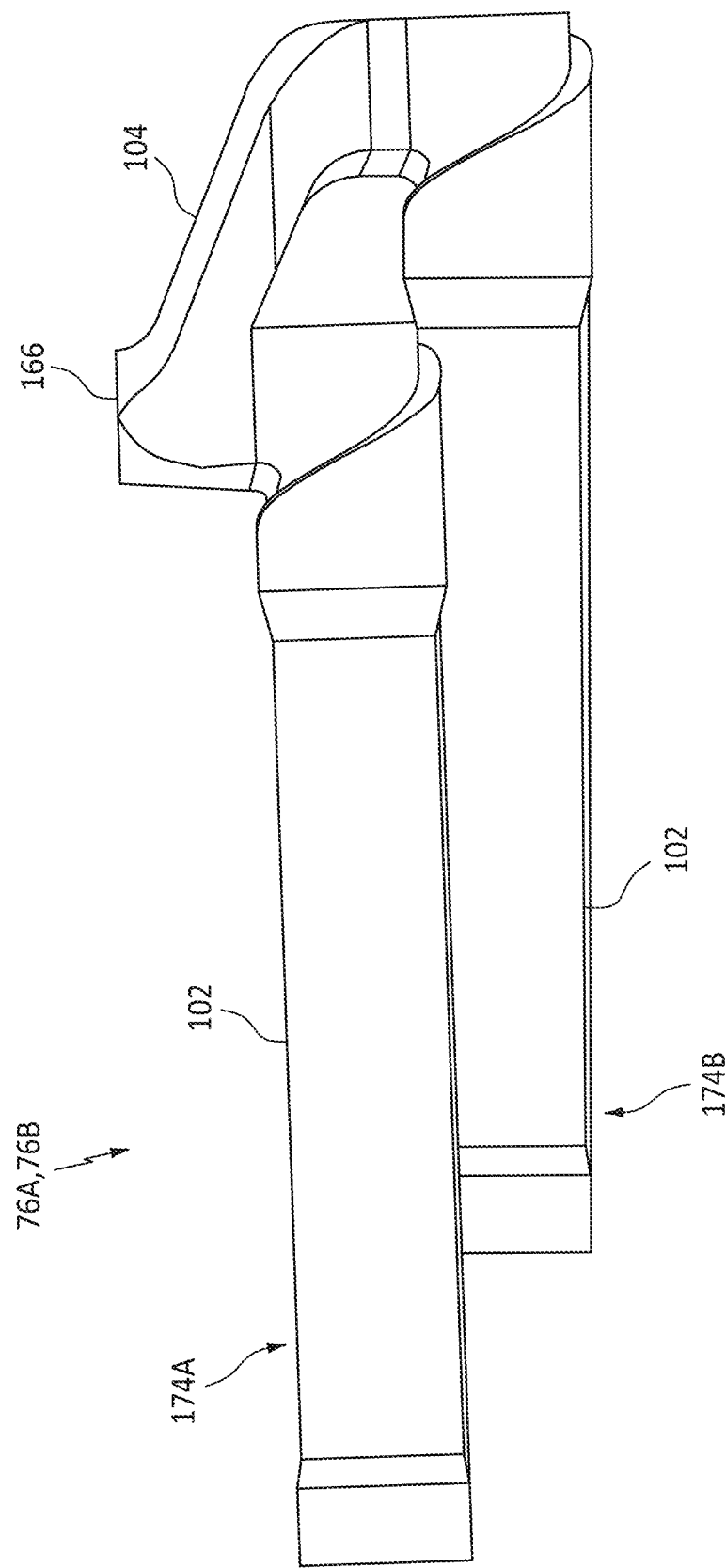
FIG. 10 is a side illustration of the air-debris separation structure with multiple pairs of the air-debris separators.
Figure 11:
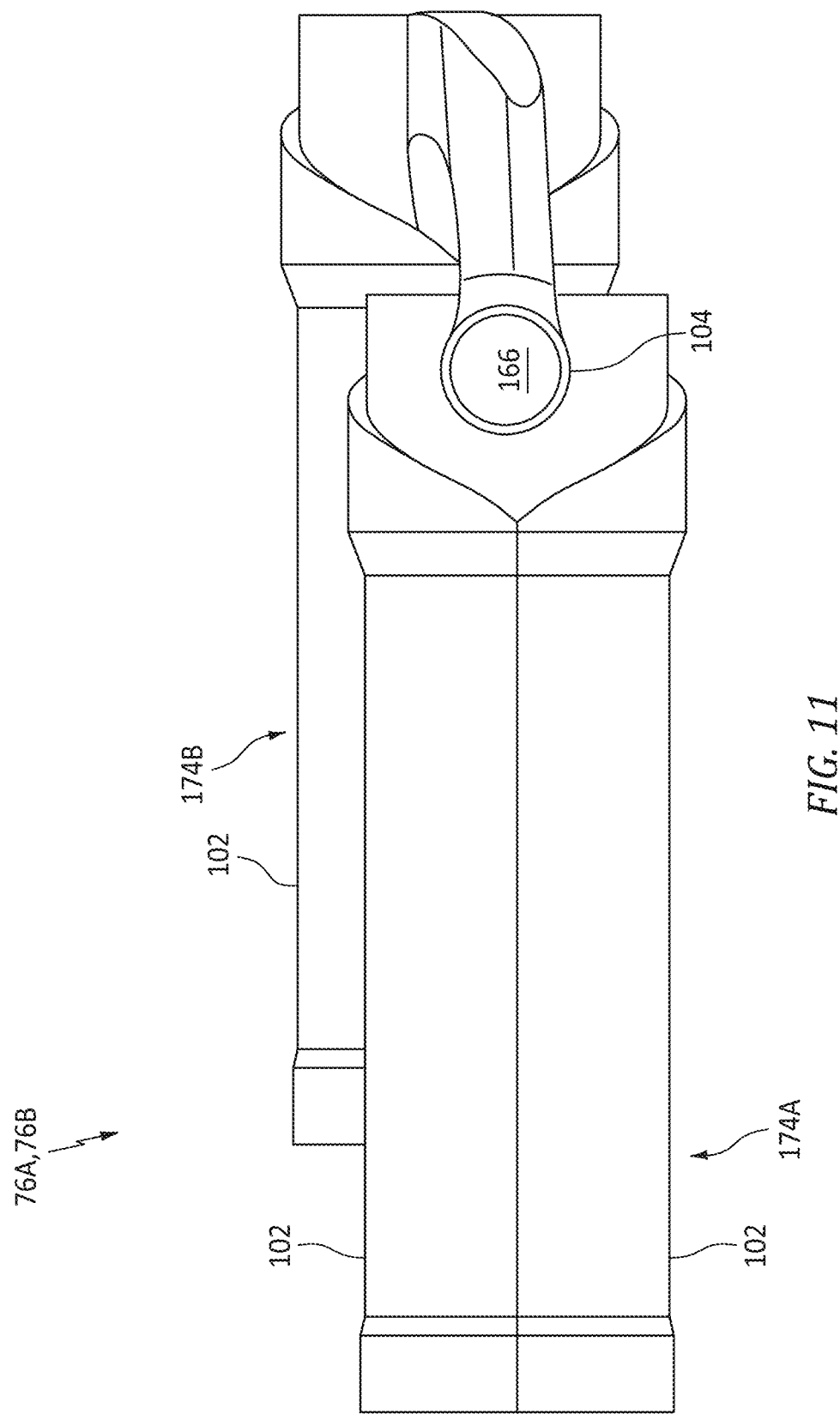
FIG. 11 is a plan view illustration of the air-debris separation structure with the multiple pairs of the air-debris separators.

In some embodiments, referring to FIG. 5, each of the air-debris separation structures 76 may (e.g., only) include a single side-by-side pair of the air-debris separators 102. In other embodiments, referring to FIGS. 10 and 11, any one or more or all of the air-debris separation structures 76 (e.g., each of the inner separation structures 76B of FIG. 12) may be configured with more than two of the air-debris separators 102; e.g., four of the air-debris separators 102. In FIGS. 10 and 11, the air-debris separators 102 included in the air-debris separation structure 76 are arranged in a first pair 174A and a second pair 174B. The air-debris separators 102 in each pair 174A, 174B (generally referred to as "174") may be longitudinally aligned and laterally next to one another. The pairs 174 of the air-debris separators 102, however, may be longitudinally offset from one another. The pairs 174 of the air-debris separators 102 may also be laterally offset from one another. However, all of the same air-debris separators 102 included in the air-debris separation structure 76 are still provided with a single common separation structure outlet 160.

Figure 12:
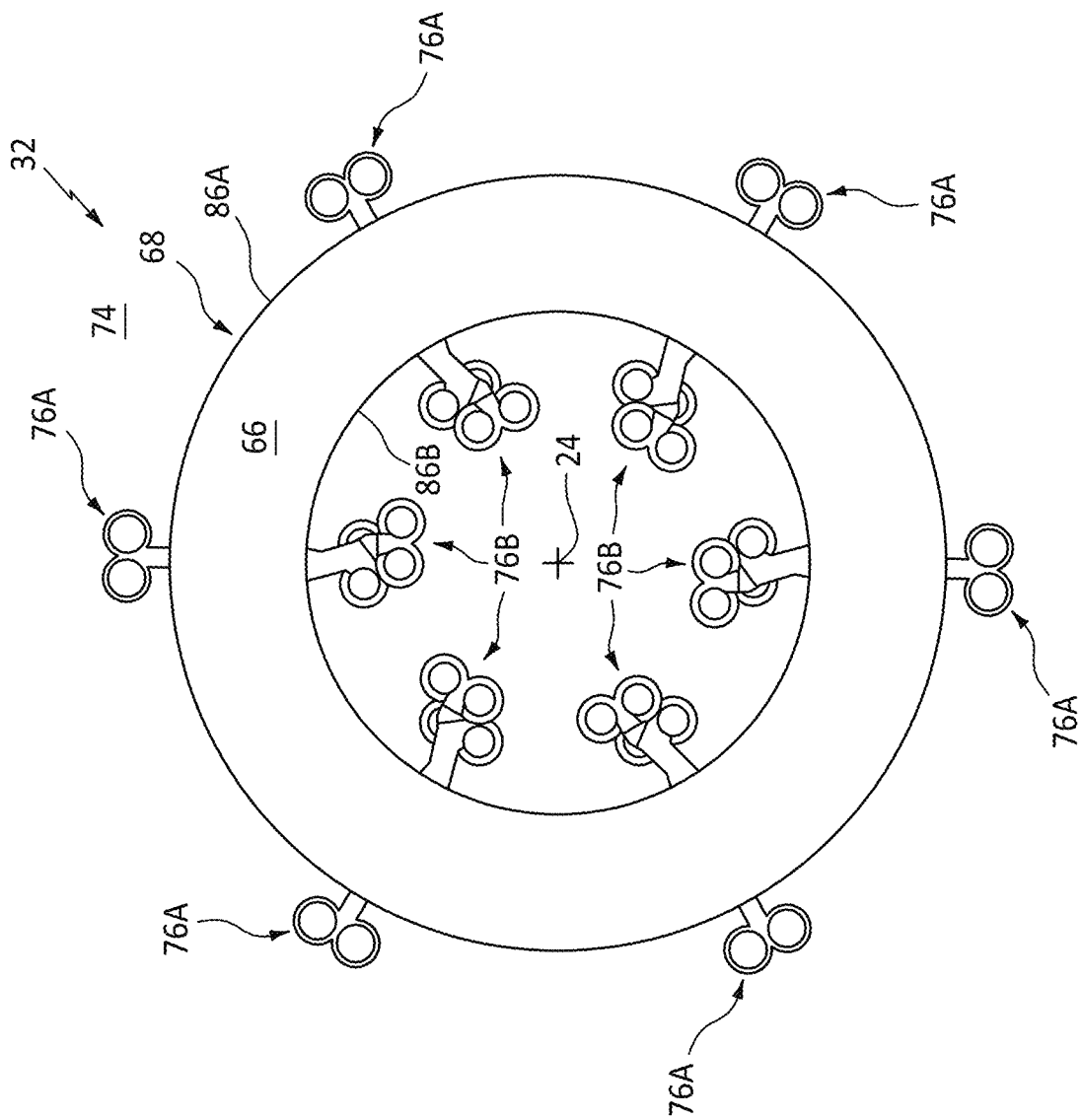
FIG. 12 is a simplified end view illustration of a combustor arranged with the air-debris separation structures, where a select subset of the separation structures are shown and enlarged in for ease of illustration.

In some embodiments, referring to FIG. 12, each of the inner separation structures 76B may be configured with the quadruplet of the air-debris separators 102 (see FIGS. 10 and 11). Each of the outer separation structures 76A may be configured with the pair of the air-debris separators 102 (see FIG. 5). Note, a select subset of the inner separation structures 76B and the outer separation structures 76A are shown and enlarged in FIG. 12 for ease of illustration.

While the air-debris separation structures 76 are described above as directing the dirty air with the debris into the combustion chamber 66, it is contemplated this dirty air may also or alternatively be routed to other destinations. For example, any one or more or all of the air-debris separation structures 76 may be configured to also (or alternatively) vent the dirty air outside of the engine core 42; e.g., into the bypass flowpath 60.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a turbine engine, comprising:
an air-debris separation structure including a first air-debris separator, a second air-debris separator and a separation structure outlet;
the first air-debris separator including a first separator inlet and a first separator outlet out from the air-debris separation structure, and the first air-debris separator fluidly coupling the first separator inlet to the first separator outlet and the separation structure outlet in parallel; and
the second air-debris separator including a second separator inlet and a second separator outlet out from the air-debris separation structure, and the second air-debris separator fluidly coupling the second separator inlet to the second separator outlet and the separation structure outlet in parallel;
wherein a first separator passage projects longitudinally within the first air-debris separator out from the first separator inlet towards the first separator outlet and the separation structure outlet;
wherein a second separator passage projects longitudinally within the second air-debris separator out from the second separator inlet towards the second separator outlet and the separation structure outlet; and
wherein a sidewall of the air-debris separation structure is between and respectively forms peripheral boundaries of the first separator passage and the second separator passage.

2. The apparatus of claim 1, wherein the first air-debris separator is next to and connected to the second air-debris separator.

3. The apparatus of claim 1, wherein the first air-debris separator is formed integral with the second air-debris separator.

4. The apparatus of claim 1, wherein the first air-debris separator comprises a vortex tube separator.

5. The apparatus of claim 1, wherein
the first air-debris separator extends longitudinally along a centerline from a first separator upstream end to a first separator downstream end;
the first separator inlet is disposed at the first separator upstream end; and
the first separator outlet and the separation structure outlet are disposed at the first separator downstream end.

6. The apparatus of claim 1, wherein the air-debris separation structure further includes an outlet conduit which projects out from the first air-debris separator and the second air-debris separator and forms the separation structure outlet.

7. An apparatus for a turbine engine, comprising:
an air-debris separation structure including a first air-debris separator, a second air-debris separator and a separation structure outlet;
the first air-debris separator including a first separator inlet and a first separator outlet out from the air-debris separation structure, and the first air-debris separator fluidly coupling the first separator inlet to the first separator outlet and the separation structure outlet in parallel; and
the second air-debris separator including a second separator inlet and a second separator outlet out from the air-debris separation structure, and the second air-debris separator fluidly coupling the second separator inlet to the second separator outlet and the separation structure outlet in parallel;
wherein the first air-debris separator includes a first separator center body, a first separator inner wall, a first separator outer wall, a first separator first outlet passage and a first separator second outlet passage;
wherein a first portion of the first separator center body extends longitudinally in a bore of the first separator outer wall, and a second portion of the first separator center body extends longitudinally in a bore of the first separator inner wall;
wherein the first separator outer wall extends longitudinally along and circumferentially about the first separator inner wall;
wherein the first separator first outlet passage is formed within the first separator inner wall, and the first separator first outlet passage extends to the first separator first separator outlet; and
wherein the first separator second outlet passage is formed between the first separator inner wall and the first separator outer wall, and the first separator second outlet passage fluidly couples the first air-debris separator to the separation structure outlet.

8. The apparatus of claim 7, wherein
the first air-debris separator further includes a first separator inlet passage; and
the first separator inlet passage is formed within the first separator outer wall, and the first separator inlet passage extends from the first separator inlet to the first separator first outlet passage and the first separator second outlet passage.

9. The apparatus of claim 7, wherein
the first air-debris separator further includes a plurality of first separator swirler vanes; and
each of the plurality of first separator swirler vanes projects out from the first separator center body to the first separator outer wall.

10. The apparatus of claim 7, wherein
the first air-debris separator further includes a plurality of first separator de-swirler vanes; and
each of the plurality of first separator de-swirler vanes projects out from the first separator center body to the first separator inner wall.

11. The apparatus of claim 7, wherein the first air-debris separator further includes a first separator helical endwall extending circumferentially about a first separator longitudinal centerline of the first air-debris separator and radially between the first separator inner wall and the first separator outer wall.

12. The apparatus of claim 11, wherein an angle, measured between the first separator helical endwall and a reference plane perpendicular to the first separator longitudinal centerline, is between twenty degrees and forty degrees.

13. The apparatus of claim 11, wherein
the first separator helical endwall has a longitudinal endwall length along the first separator longitudinal centerline;
the separation structure outlet has a longitudinal outlet length along the first separator longitudinal centerline; and
the longitudinal outlet length is between forty percent and eighty percent of the longitudinal endwall length.

14. The apparatus of claim 7, wherein
the second air-debris separator includes a second separator center body, a second separator inner wall, a second separator outer wall, a second separator first outlet passage and a second separator second outlet passage;
a first portion of the second separator center body extends longitudinally in a bore of the second separator outer wall, and a second portion of the second separator center body extends longitudinally in a bore of the second separator inner wall;

the second separator outer wall extends longitudinally along and circumferentially about the second separator inner wall, and the second separator outer wall is connected to the first separator outer wall at a lateral interface between the first air-debris separator and the second air-debris separator;
the second separator first outlet passage is formed within the second separator inner wall, and the second separator first outlet passage extends to the second separator first outlet; and
the second separator second outlet passage is formed between the second separator inner wall and the second separator outer wall, and the second separator second outlet passage fluidly couples the second air-debris separator to the separation structure outlet.

15. An apparatus for a turbine engine, comprising:
an engine core extending along an axis, the engine core including a combustor, a diffuser plenum and an air-debris separation structure;
the combustor arranged within the diffuser plenum, the combustor including a combustion chamber and a combustor wall between the combustion chamber and the diffuser plenum, and the combustor wall comprising a quench aperture extending through the combustor wall to the combustion chamber; and
the air-debris separation structure including a first air-debris separator, a second air-debris separator and a separation structure outlet;
the first air-debris separator including a first separator inlet and a first separator outlet out from the air-debris separation structure, and the first air-debris separator fluidly coupling the first separator inlet to the first separator outlet and the separation structure outlet in parallel;
the second air-debris separator including a second separator inlet and a second separator outlet out from the air-debris separation structure, and the second air-debris separator fluidly coupling the second separator inlet to the second separator outlet and the separation structure outlet in parallel; and
the air-debris separation structure configured to receive compressed air from the diffuser plenum through the first separator inlet and the second separator inlet, and the separation structure outlet fluidly coupled to the quench aperture.

* * * * *